J. P. REYNOLDS.
Animal Stock.
No. 31,213.
Patented Jan. 22, 1861.
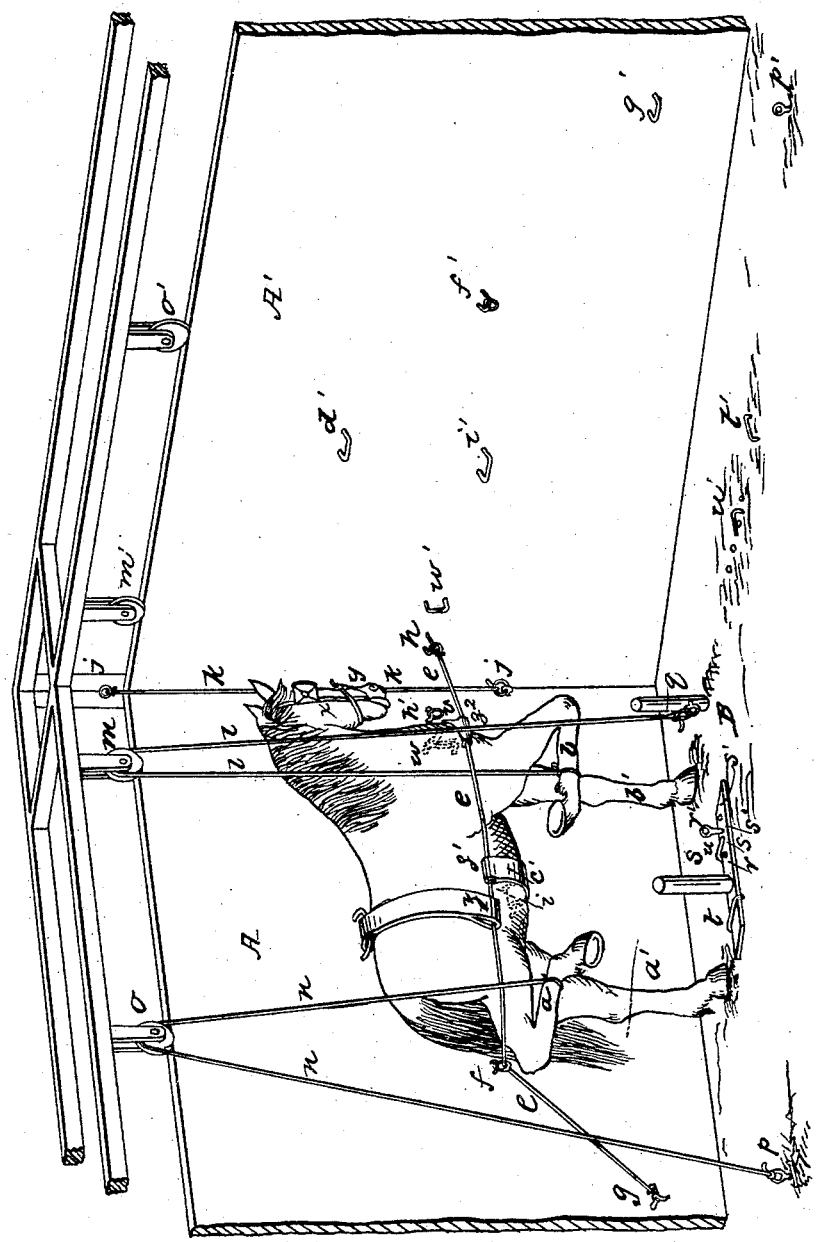

UNITED STATES PATENT OFFICE.

JOHN P. REYNOLDS, OF MIRABILE, MISSOURI, ASSIGNOR TO H. H. ROBERTSON AND C. G. CARR, OF KINGSTON, MISSOURI.

HARNESS FOR SHOEING HORSES.

Specification of Letters Patent No. 31,213, dated January 22, 1861.

*To all whom it may concern:*

Be it known that I, JOHN P. REYNOLDS, of Mirabile, in the county of Caldwell and State of Missouri, have invented a new and Improved Apparatus for Shoeing Horses; and I do hereby declare that the following is a full, clear, and exact description of the same, reference being had to the annexed drawings, making a part of this specification, and being a perspective view of my improved horseshoeing apparatus.

The nature of the invention consists in the arrangement of straps $c, c', v$, and ropes $n, l, k$, in combination with pulleys $m, m'$, $o, o'$, and movable post $s$, substantially as and for the purpose hereinafter described.

The object of this invention is to confine the horse in such a manner as to keep him still while being shod.

Two straps $c, c'$, both being connected to a rope $e$, are passed around the body of the horse and are at their outer ends secured to staples $d, i$, projecting from the wall A. Another strap $v$, is also connected to the rope $e$, at one end and at the other end it is secured to a staple $w$, projecting from wall A. The strap $v$, is intended to pass around the breast of the horse. The forward end of the rope $e$, is fastened to a staple $h$, in the wall A'. The rear part of rope $e$, passes around the back of the horse under the tail and through a ring $f$, hung to the wall A. The end of the rope $e$, is tied to a staple $g$, projecting from wall A. In this manner it will be seen the horse is confined to wall A, so that he can move neither sidewise nor forward or backward. The connection between the straps $c, c', v$, and rope $e$, is formed by the rope passing through loops at the ends of the straps as seen at $z, z', z^2$. Thus the rope and straps will adapt themselves to horses of any size. When the horse has been shod he may be liberated by untying the rear end of rope $e$, and drawing the rope out of the loops $z, z'$. The horse's head is secured (by means of headstall $x, y$,) to a vertical rope $k$, secured at its ends to staples $j, j$. Ropes $l, n$, are tied to the fore and hind foot, $b$, and $a$, of the horse respectively when it is desired to raise either of the horse's feet $a, b$.

$q$, and $s$, are the posts for dressing the hoofs, and for clenching the nails. When the other two feet $a', b'$, of the horse are to be shod, the horse is confined to wall A', in the same manner as above described with reference to wall A, using the staples $h', w'$, $d', i', f', g'$, and pulleys $m, o$. The rope $k$, remains in its place and serves for securing the horse's head the same as before. The post $q$, serves for the fore foot of the horse as before described. The post $s$, however is made movable so that one post $s$, may be made to answer for both positions of the horse. For this purpose the post $s$, is secured to a bar $r$, which may be slipped underneath either of the staples $t, u$, or $t', u'$, projecting from the floor B, and confined by passing a pin $r'$, through one of the holes $s'$, of said bar, into a hole in the floor B. The bar $r$, is provided with a number of holes $s'$, in order to adjust the post $s$, at any desirable distance from the horse's hind feet.

Having thus described my invention, what I claim as new and desire to secure by Letters Patent, is—

The combination of the straps $e, c, c'$, and $v$, cords $l, n$, and movable post $s$, the said parts being applied arranged and secured substantially as and for the purposes set forth.

JOHN P. REYNOLDS.

Witnesses:
 A. B. SCOVEL,
 W. H. HAUS.